(12) United States Patent
Lee et al.

(10) Patent No.: US 11,537,296 B2
(45) Date of Patent: Dec. 27, 2022

(54) STORAGE DEVICE AND OPERATING METHOD THEREOF

(71) Applicant: SK hynix Inc., Gyeonggi-do (KR)

(72) Inventors: Han Bin Lee, Gyeonggi-do (KR); Hyo Jae Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/325,730

(22) Filed: May 20, 2021

(65) Prior Publication Data

US 2022/0147250 A1    May 12, 2022

(30) Foreign Application Priority Data

Nov. 11, 2020  (KR) .......................... 10-2020-0150251

(51) Int. Cl.
*G06F 12/00* (2006.01)
*G06F 3/06* (2006.01)

(52) U.S. Cl.
CPC ............ *G06F 3/0619* (2013.01); *G06F 3/064* (2013.01); *G06F 3/0632* (2013.01); *G06F 3/0649* (2013.01); *G06F 3/0659* (2013.01); *G06F 3/0673* (2013.01)

(58) Field of Classification Search
CPC ...... G06F 3/0619; G06F 3/0632; G06F 3/064; G06F 3/0649; G06F 3/0659; G06F 3/0673

USPC ......................................................... 711/154
See application file for complete search history.

(56) References Cited

U.S. PATENT DOCUMENTS

| | | | | |
|---|---|---|---|---|
| 5,263,032 A | * | 11/1993 | Porter | G06F 11/106 714/764 |
| 8,040,727 B1 | * | 10/2011 | Harari | G06F 3/0616 365/185.11 |

FOREIGN PATENT DOCUMENTS

| | | | | |
|---|---|---|---|---|
| KR | 10-2017-0084467 A | 7/2017 | | |
| KR | 10-2020-0050673 A | 5/2020 | | |
| WO | WO-2009124320 A1 | * | 10/2009 | ............ G06F 11/006 |

* cited by examiner

*Primary Examiner* — Mardochee Chery
(74) *Attorney, Agent, or Firm* — IP & T Group LLP

(57) ABSTRACT

A storage device may include a memory device and a memory controller. The memory device may include a plurality of data blocks, a plurality of replacement blocks to replace bad blocks, and a system block configured to store default system information. The memory controller may store, based on a result of comparing a lifetime of the memory device with a reference value, update system information corresponding to an update of the default system information, in a selected replacement block among the plurality of replacement blocks. The memory controller may control the memory device to set the selected replacement block as a target system block. The default system information may include one or more parameters corresponding to at least one operation among a read operation, a program operation, and an erase operation of the memory device.

20 Claims, 14 Drawing Sheets

STORAGE DEVICE AND OPERATING METHOD THEREOF

CROSS-REFERENCE TO RELATED APPLICATION

The present application claims priority under 35 U.S.C. § 119(a) to Korean patent application number 10-2020-0150251, filed on Nov. 11, 2020, which is incorporated herein by reference in its entirety.

BACKGROUND

Field of Invention

One or more embodiments described herein relates to a storage device and a method of operating a storage device.

Description of Related Art

A storage device may include a memory controller for controlling the storage of data in a memory device, under control of a host such as a computer or a smart phone.

The memory device may be a volatile memory device or a nonvolatile memory device. A volatile memory device stores data only when power is supplied. The stored data is lost when the supply of power is interrupted. Examples of a volatile memory device include a Static Random Access Memory (SRAM) and a Dynamic Random Access Memory (DRAM).

A nonvolatile memory device stores data even when the supply of power is interrupted. Examples of a nonvolatile memory device include a Read Only Memory (ROM), a Programmable ROM (PROM), an Electrically Programmable ROM (EPROM), an Electrically Erasable ROM (EEROM), and a flash memory.

SUMMARY

One or more embodiments described herein provide a storage device which may have improved system block management performance. One or more other embodiments cover a method of operating a storage device in a manner that may achieve improved system block management performance.

In accordance with an aspect of the present disclosure, there is provided a storage device including: a memory device including a plurality of data blocks, a plurality of replacement blocks to replace bad blocks, and a system block configured to store default system information; and a memory controller configured to store, based on a result of comparing a lifetime of the memory device with a reference value, update system information corresponding to an update of the default system information, in a selected replacement block among the plurality of replacement blocks, and to control the memory device to set the selected replacement block as a target system block, wherein the default system information includes one or more parameters corresponding to at least one operation among a read operation, a program operation, and an erase operation of the memory device.

In accordance with another aspect of the present disclosure, there is provided a method for operating a memory device, the method including: storing, based on a result of comparing a lifetime of the memory device with a reference value, update system information corresponding to an update of default system information stored in a system block, in a selected replacement block among a plurality of replacement blocks for replacing bad blocks, and setting the selected replacement block as a target system block, wherein the default system information includes one or more parameters corresponding to at least one operation among a read operation, a program operation, and an erase operation of the memory device.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
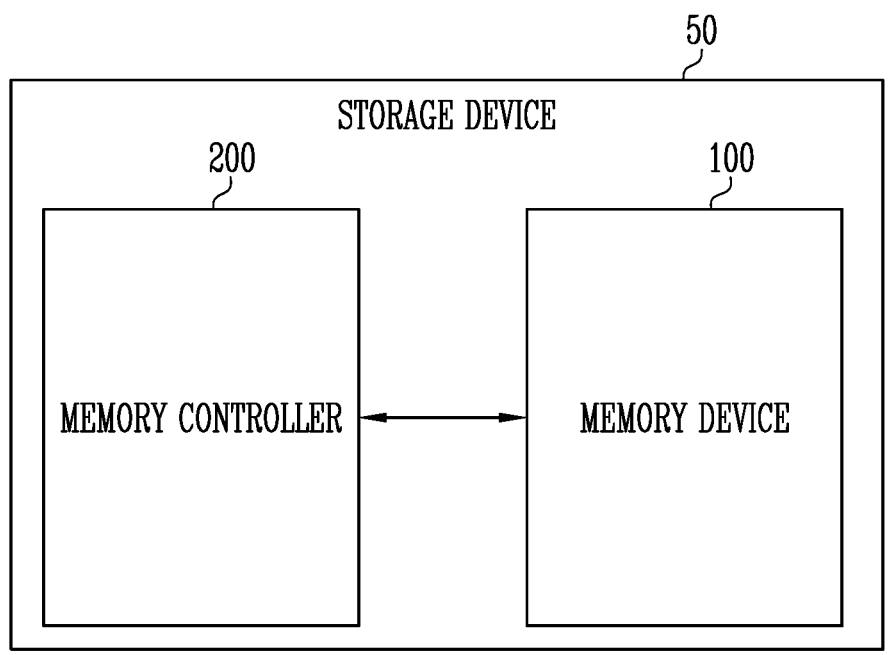
FIG. 1 illustrates an embodiment of a storage device.

FIG. 1 is a diagram illustrating an embodiment of a storage device 50, which may include a memory device 100 and a memory controller 200. The storage device 50 may store data under control of a host. Examples of the host include a mobile phone, a smart phone, an MP3 player, a laptop computer, a desktop computer, a game console, a TV, a tablet PC or an in-vehicle infotainment.

The storage device 50 may be manufactured as one of various types of storage devices, for example, according to a host interface that implements a communication scheme with the host. Example of the storage device 50 include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and a memory stick.

The storage device 50 may be manufactured as one of various kinds of package types. Examples include a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data and may operate under control of the memory controller 200. The memory device 100 may include a memory cell array which includes a plurality of memory cells for storing data. Each of the memory cells may be configured, for example, as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells. One memory block may include a plurality of pages. In an embodiment, a page may be a unit for storing data in the memory device 100 or for reading data stored in the memory device 100.

The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), or a Spin Transfer Torque Random Access Memory (STT-RAM). For convenience of description, a case where the memory device 100 is a NAND flash memory is described in connection with some embodiments as an example.

The memory device 100 receives commands and addresses from the memory controller 200 and accesses areas selected by the addresses in the memory cell array. For example, the memory device 100 may perform operation instructed by a command on the area selected by an address. Examples of the operations that may be performed by the memory device 100 include a write (program) operation, a read operation, and/or an erase operation. In a program operation, the memory device 100 may program data in the area selected by an address. In a read operation, the memory device 100 may read data from the area selected by an address. In the erase operation, the memory device 100 may erase data stored in the area selected by an address.

The memory controller 200 may control overall operations of the storage device 50. When power is applied to the storage device 50, the memory controller 200 may execute instructions, e.g., firmware (FW). When the memory device 100 is a flash memory device, the memory controller 200 may execute FW (e.g., a Flash Translation Layer (FTL)) for controlling communication between the host and the memory device 100.

In an embodiment, the memory controller 200 may receive data and a Logical Block Address (LBA) from the host and may translate the LBA to a Physical Block Address (PBA) representing addresses of memory cells in the memory device 100 in which data is to be stored.

The memory controller 200 may control the memory device 100 to perform a program operation, a read operation, an erase operation, and/or another operation in response to a request from the host. In a program operation, the memory controller 200 may provide a program command, a PBA, and data to the memory device 100. In a read operation, the memory controller 200 may provide a read command and a PBA to the memory device 100. In an erase operation, the memory controller 200 may provide an erase command and a PBA to the memory device 100.

In an embodiment, the memory controller 200 may autonomously generate a command, an address, and data regardless of any request from the host, and may transmit the command, the address, and the data to the memory device 100. For example, the memory controller 200 may provide the command, the address, and the data to the memory device 100 to perform one or more background operations, including but not limited to a program operation for wear leveling or a program operation for garbage collection.

In an embodiment, the memory controller 200 may control at least two memory devices 100. The memory controller 200 may control the memory devices according to, for example, an interleaving scheme to improve operational performance. The interleaving scheme may be an operating scheme that allows operation periods of at least two memory devices 100 to overlap with each other.

In an embodiment, the memory device 100 may include a plurality of data blocks, a plurality of replacement blocks (e.g., for replacing one or more bad blocks), and a system block for storing default system information. The default system information may include one or more parameters associated with operation of the memory device 100. For example, the default system information may include one or more parameters associated with at least one operation among a read operation, a program operation, and an erase operation. The parameters associated with the at least one operation may include, for example, information corresponding to a voltage to be applied in a corresponding operation or information corresponding to a time for which the voltage is applied.

In an embodiment, the memory controller 200 may determine the lifetime of the memory device 100 based on an erase and write count of the plurality of data blocks. The lifetime of the memory device 100 may be considered to be older as the erase and write count becomes higher.

The memory controller 200 may control the memory device 100 to store update system information (e.g., obtained by updating the default system information stored in the system block, in a selected one of the plurality of replacement blocks) based on a result of comparing the lifetime of the memory device 100 with a reference value. The memory controller 200 may perform a system block changing operation, which may include setting the selected replacement block as a target system block.

In one embodiment, the memory device 100 may be booted after a system block changing operation is performed. When the memory device 100 is booted after a system block changing operation is performed, default system information loaded into a system register of the memory device 100 may be changed to correspond to the update system information stored in the target system block. The update system information may include one or more parameters obtained, for example, by updating the one or more parameters in the default system information as the lifetime of the memory device 100 elapses.

For example, the default system information may include one or more parameters corresponding to a start voltage of the read operation, a program operation, or an erase operation, a step voltage, a voltage applying time, or another voltage or parameter set, for example, at the time of manufacture of the memory device 100. In one embodiment, the update system information may include parameters associated with a start voltage of a read operation, a program operation, or an erase operation, a step voltage, a voltage applying time, etc., which may be updated as the lifetime of the memory device 100 elapses.

The memory controller 200 may provide a reset command to the memory device 100 after the memory device 100 is booted. The memory device 100 may load the default system information stored in the system block into the system register in response to the reset command.

After the system block changing operation, the memory controller 200 may provide the memory device 100 with system block read command for reading the update system information stored in the target system block. The memory controller 200 may provide the system block read command to the memory device, for example, after the memory controller 200 provides the memory device 100 with the reset command for reading the default system information.

In a first case, the memory controller 200 may provide the system block read command to the memory device 100 based on a result of comparing the lifetime of the memory device 100 with the reference value. The memory device 100 may read the update system information stored in the target system block in response to the system block read command. The memory device 100 may then change the default system information loaded into the system register to the update system information.

In a second case, the memory device 100 may receive lifetime information of the memory device 100 from the memory controller 200 and may store the received lifetime information. After the memory device 100 receives the reset command, the memory device 100 may compare the lifetime of the memory device 100 with the reference value based on the lifetime information of the memory device 100. The memory device 100 may read the update system information stored in the target system block based on a result of comparing the lifetime of the memory device 100 with the reference value. The memory device 100 may then change the default system information loaded into the system register to correspond to the update system information.

In the first case mentioned above, after the system block changing operation is performed, the memory device 100 may load the update system information stored in the target system block into the system register under control of the memory controller 200. In the second case mentioned above, the memory device 100 may autonomously load the update system information stored in the target system block into the system register.

Each memory cell may become degraded as the lifetime of the memory device 100 elapses. The memory device 100 may perform a read retry operation of changing and reading a read voltage to determine a threshold voltage distribution of the degraded memory cell. Since each degraded memory cell may be over-programmed (e.g., even in the same program voltage applying condition), the threshold voltage distribution of the degraded memory cell(s) may be deviate from (e.g., formed at the right of) a normal threshold voltage distribution.

In accordance with an embodiment, the memory device 100 may load one or more updated parameters (i.e., age-optimized parameters) into the system register as the lifetime of the memory device 100 elapses. As a result, the memory device 100 may perform a read operation, a program operation, or an erase operation based on the one or more updated (e.g., optimized) parameters, so that over-programming can be prevented and/or the frequency of unnecessary read retry operations can be reduced.

The host may communicate with the storage device 50 using at least one or more communication interfaces, standards, or protocols. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
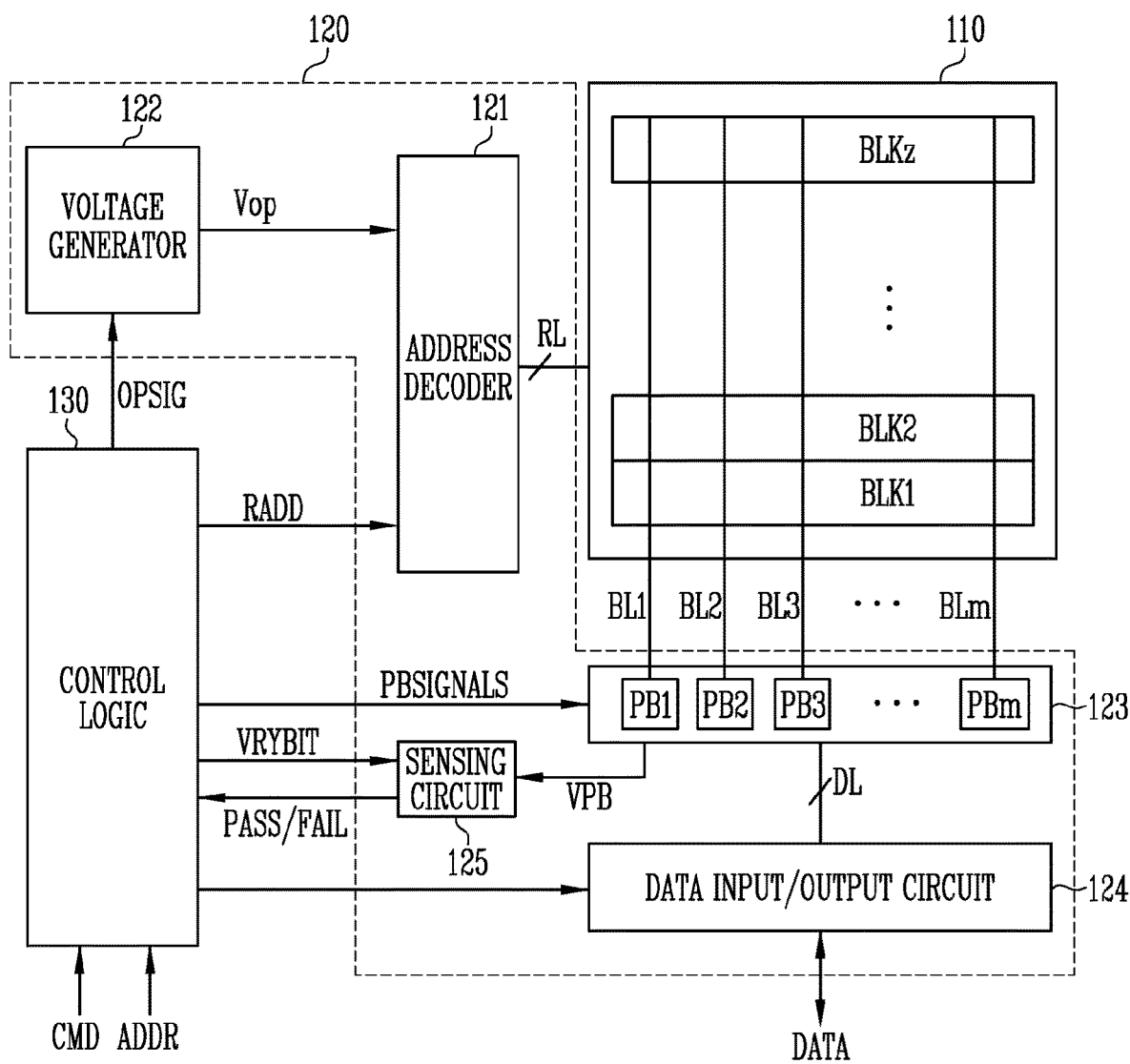
FIG. 2 illustrates an embodiment of a memory device.

FIG. 2 is a diagram illustrating an embodiment of memory device 100, which may include a memory cell array 100, a peripheral circuit 120, and a control logic 130.

Referring to FIG. 2, the memory cell array 110 includes a plurality of memory blocks BLK1 to BLKz connected to an address decoder 121 through row lines RL and connected to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells connected to the same word line may correspond to one physical page. In one embodiment, the memory cell array 110 may be configured with a plurality of physical pages. In accordance with an embodiment, each of the plurality of memory blocks BLK1 to BLKz in the memory cell array 110 may include a plurality of dummy cells. One or more dummy cells may be connected in series between a drain select transistor and one or more memory cells, and/or between a source select transistor and one or more memory cells.

Each of the memory cells may be configured, for example, as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the address decoder 121, a voltage generator 122, the read/write circuit 123, a data input/output circuit 124, and a sensing circuit 125. The peripheral circuit 120 drives the memory cell array 110, e.g., the peripheral circuit 120 may drive the memory cell array 110 to perform a program operation, a read operation, and an erase operation.

The address decoder 121 is connected to the memory cell array 110 through the row lines RL. For example, the row lines RL may include drain select lines, word lines, source select lines, and a common source line. In accordance with an embodiment, the word lines may include normal word lines and dummy word lines. In accordance with an embodiment, the row lines RL may further include a pipe select line.

The address decoder 121 may operate under control of the control logic 130 and may receive an address ADDR from the control logic 130. The address decoder 121 may decode a block address in the received address ADDR and then select at least one memory block among memory blocks BLK1 to BLKz according to the decoded block address. The address decoder 121 may decode a row address in the received address ADDR and then may select at least one word line among word lines of a memory block according to the decoded row address. The address decoder 121 may apply an operating voltage Vop, supplied from the voltage generator 122, to the selected word line.

In a program operation, the address decoder 121 may apply a program voltage to the selected word line and may apply a pass voltage (having a level different from (e.g., lower than) that of the program voltage) to unselected word lines.

In a program verify operation, the address decoder 121 may apply a verify voltage to the selected word line and may apply a verify pass voltage (e.g., having a level different from (e.g., higher than) that of the verify voltage) to the unselected word lines.

In a read operation, the address decoder 121 may apply a read voltage to the selected word line and may apply a read pass voltage (having a level different from (e.g., higher than) that of the read voltage) to the unselected word lines.

In accordance with an embodiment, an erase operation of the memory device 100 is performed in units of memory blocks. In an erase operation, the address ADDR input to the memory device 100 includes a block address. The address decoder 121 may decode the block address and select at least one memory block according to the decoded block address. In the erase operation, address decoder 121 may apply a reference (e.g., ground) voltage to word lines connected to the selected memory block.

In accordance with an embodiment, the address decoder 121 may decode a column address in the received address ADDR. The decoded column address may be transmitted to the read/write circuit 123. In an example, the address decoder 121 may include one or more components, including but not limited a row decoder, a column decoder, and/or an address buffer.

The voltage generator 122 may generate a plurality of operating voltages Vop using an external power voltage supplied to memory device 100. The voltage generator 122 may operate under control of the control logic 130. In an embodiment, the voltage generator 122 may generate an internal power voltage by regulating the external power voltage. The internal power voltage generated by the voltage generator 122 may be used as an operation voltage of the memory device 100.

In an embodiment, the voltage generator 122 may generate a plurality of operating voltages Vop using, for example, the external power voltage or the internal power voltage. The voltage generator 122 may generate various voltages for the memory device 100. Examples include one or more of a plurality of erase voltages, a plurality of program voltages, a plurality of pass voltages, a plurality of select read voltages, and a plurality of unselect read voltages.

In order to generate a plurality of operating voltages Vop of various voltage levels, the voltage generator 122 may include a plurality of pumping capacitors for receiving the internal power voltage. The operating voltages Vop may be generated by voltage generator 122 by selectively activating the pumping capacitors under control of control logic 130. The generated operating voltages Vop may be supplied to the memory cell array 110 by the address decoder 121.

The read/write circuit 123 may include first to mth page buffers PB1 to PBm connected to memory cell array 110 through respective ones of the first to mth bit lines BL1 to BLm. The first to mth page buffers PB1 to PBm may operate under control of the control logic 130.

The first to mth page buffers PB1 to PBm communicate data DATA with the data input/output circuit 124. In a program operation, the first to mth page buffers PB1 to PBm may receive data DATA to be stored through the data input/output circuit 124 and data lines DL.

For example, in a program operation, the first to mth page buffers PB1 to PBm may transfer, to selected memory cells through bit lines BL1 to BLm, data DATA received through the data input/output circuit 124 when a program pulse is applied to a selected word line. The memory cells of the selected memory cells may be programmed according to the transferred data DATA. A memory cell connected to a bit line through which a program allow voltage (e.g., a ground voltage) is applied may have an increased threshold voltage. A threshold voltage of a memory cell connected to a bit line, through which a program inhibit voltage (e.g., a power voltage) is applied, may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL and may store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is connected to the first to mth page buffers PB1 to PBm through the data lines DL, and may operate under control of the control logic 130. The data input/output circuit 124 may include a plurality of input/output buffers that receive input data DATA. In a program operation, the data input/output circuit 124 may receive data DATA to be stored from an external controller. In a read operation, the data input/output circuit 124 may output, to the external controller, data transmitted from the first to mth page buffers PB1 to PBm in the read/write circuit 123.

In a read operation or verify operation, the sensing circuit 125 may generate a reference current in response to an allow bit VRYBIT signal generated by the control logic 130. The sensing circuit 125 may output a pass signal or fail signal to the control logic 130 by comparing a sensing voltage VPB received from the read/write circuit 123 and a reference voltage generated by the reference current.

The control logic 130 may be connected to the address decoder 121, the voltage generator 122, the read/write circuit 123, the data input/output circuit 124, and the sensing circuit 125. The control logic 130 may control overall operations of the memory device 100 and may operate, for example, in response to a command CMD transferred from an external device.

In one embodiment, the control logic 130 may control the peripheral circuit 120 by generating one or more signals in response to a command CMD and an address ADDR. For example, the control logic 130 may generate an operation signal OPSIG, a row address RADD, a read/write circuit control signal PBSIGNALS, and an allow bit VRYBIT in response to a command CMD and an address ADDR. The control logic 130 may output the operation signal OPSIG to the voltage generator 122, may output the row address RADD to the address decoder 121, may output the read/write circuit control signal PBSIGNALS to the read/write circuit 123, and may output the allow bit VRYBIT to the sensing circuit 125. Also, control logic 130 may determine whether the verify operation has passed or failed in response to the pass or fail signal PASS/FAIL output by sensing circuit 125.

Figure 3:
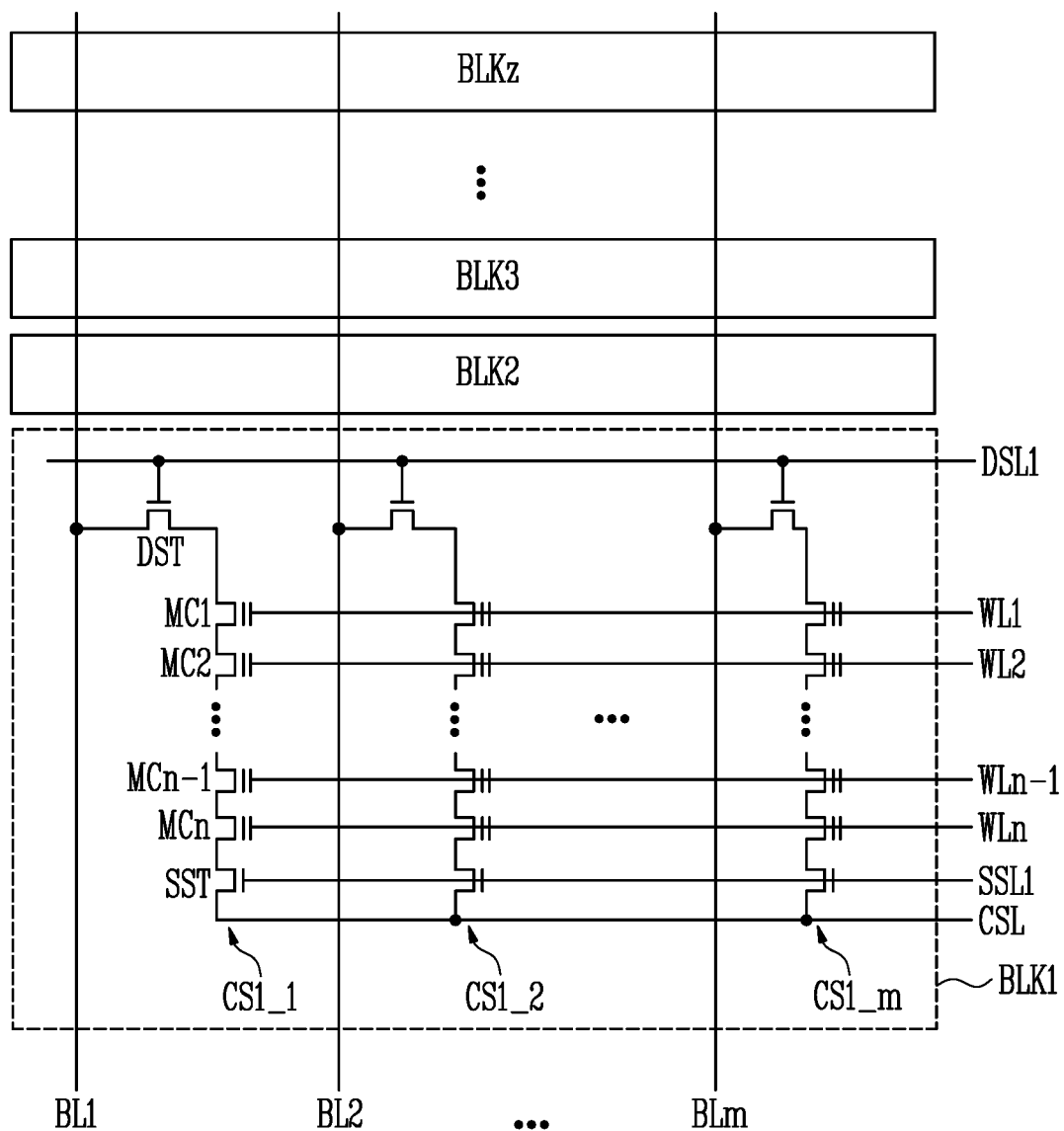
FIG. 3 illustrates an embodiment of a memory cell array.

FIG. 3 is a diagram illustrating an embodiment of the memory cell 110 array shown in FIG. 2. Referring to FIG. 3, first to zth memory blocks BLK1 to BLKz are commonly connected to the first to mth bit lines BL1 to BLm. In FIG. 3, for convenience of description, components in the first memory block BLK1 (among the plurality of memory blocks BLK1 to BLKz) are illustrated as representative examples of components in the memory blocks BLK1 to BLKz.

The memory block BLK1 may include a plurality of cell strings CS1_1 to CS1_m (m is a positive integer). First to mth cell strings CS1_1 to CS1_m are respectively connected to the first to mth bit lines BL1 to BLm. Each of the first to mth cell strings CS1_1 to CS1_m includes a drain select transistor DST, a plurality of memory cells MC1 to MCn (n is a positive integer) connected in series, and a source select transistor SST.

A gate terminal of the drain select transistor DST in each of the first to mth cell strings CS1_1 to CS1_m is connected to a drain select line DSL1. Gate terminals of first to nth memory cells MC1 to MCn in each of the first to mth cell strings CS1_1 to CS1_m are respectively connected to first to nth word lines WL1 to WLn. A gate terminal of the source select transistor SST in each of the first to mth cell strings CS1_1 to CS1_m is connected to a source select line SSL1.

For convenience of description, the structure of first cell string CS1_1 will be described as a representative example of the structures of the plurality of cell strings CS1_1 to CS1_m.

The drain select transistor DST in the first cell string CS1_1 has a drain terminal connected to the first bit line BL1 and a source electrode connected to a drain terminal of the first memory cell MC1 in the first cell string CS1_1. The first to nth memory cells MC1 to MCn are connected in series to each other. A drain terminal of the source select transistor SST in the first cell string CS1_1 is connected to a source terminal of the nth memory cell MCn in the first cell string CS1_1. A source terminal of the source select transistor SST in the first cell string CS1_1 is connected to a common source line CSL. In an embodiment, common source line CSL may be commonly connected to the first to zth memory blocks BLK1 to BLKz.

The drain select line DSL1, the first to nth word lines WL1 to WLn, and the source select line SSL1 are in the row lines RL shown in FIG. 2. The drain select line DSL1, the first to nth word lines WL1 to WLn, and the source select line SSL1 are controlled by the address decoder 121 shown in FIG. 2. The common source line CSL may be controlled by the control logic 130 shown in FIG. 2. The first to mth bit lines BL1 to BLm are controlled by the read/write circuit 123 shown in FIG. 2.

Figure 4:
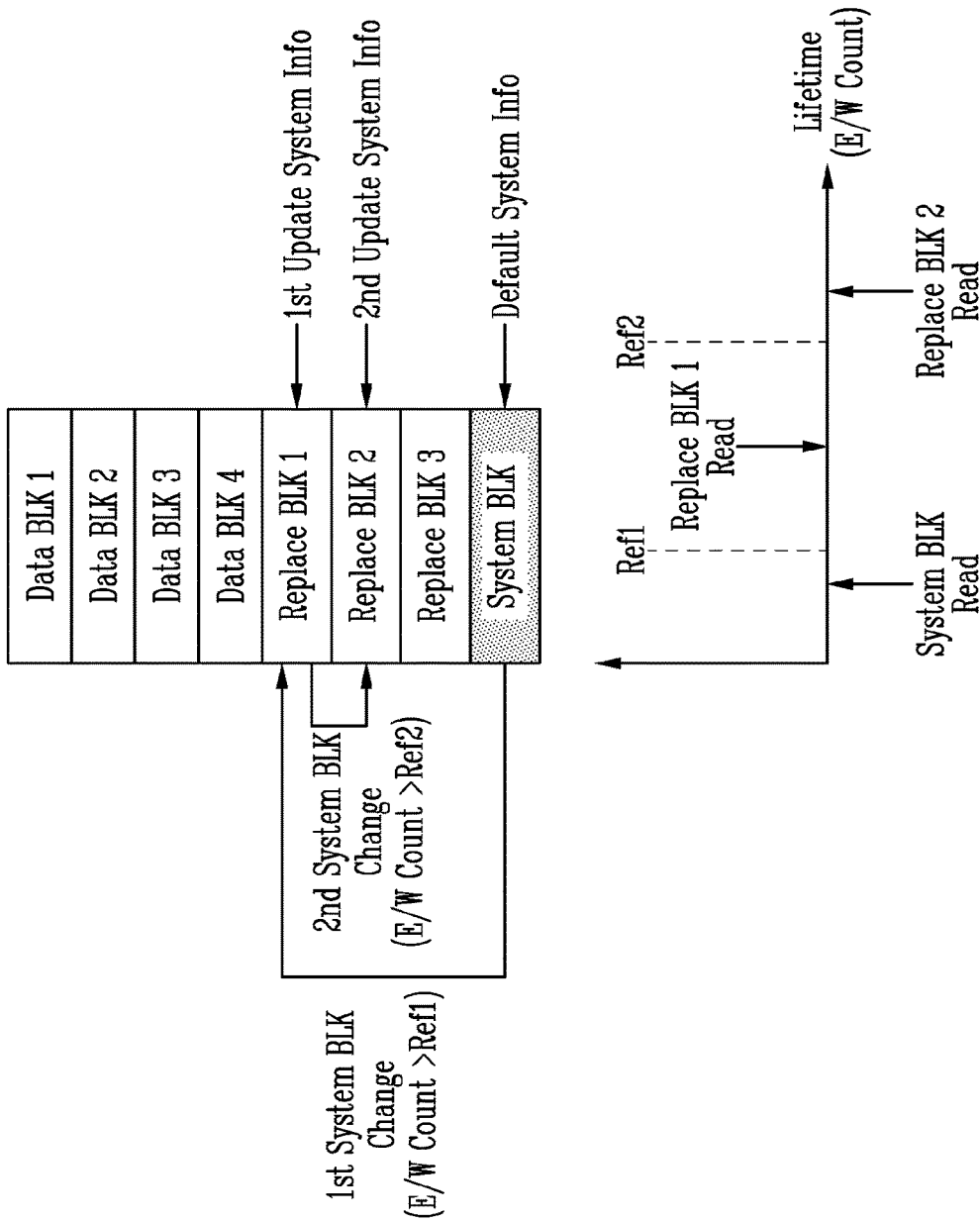
FIG. 4 illustrates an embodiment of a system block changing operation.

FIG. 4 is a diagram illustrating an embodiment of a system block changing operation. Referring to FIG. 4, the memory device may include first to fourth data blocks Data BLK 1 to Data BLK 4, first to third replacement blocks Replace BLK 1 to Replace BLK 3, and a system block System BLK.

In one embodiment, when a bad block occurs among the first to fourth data blocks Data BLK 1 to Data BLK 4, the first to third replacement blocks Replace BLK 1 to Replace BLK 3 may be used to replace the corresponding bad block. Numbers of data blocks, replacement blocks, and system blocks in the memory device may vary among embodiments.

The system block System BLK may store default system block. In an embodiment, the system block may be allocated to a Content Addressable Memory (CAM) area. The default system information may include parameters associated with operation of the memory device. For example, the default system information may include parameters associated with at least one operation among a read operation, a program operation, and an erase operation. The parameters associated with the at least one operation may include information on a voltage applied in the at least one operation, information on a time for which the voltage is applied, and/or other information. Parameters associated with the program operation may include, for example, program start voltage information, program step voltage information, program voltage applying time information, program pass voltage information, and/or other information.

In FIG. 4, a case is described where the lifetime (or age) of the memory device corresponds to an erase and write count of the memory device. In an embodiment, when the erase and write count is less than or equal to a first reference value Ref1, the memory device may perform the read operation, the program operation, or the erase operation based on the parameters in the default system information stored in the system block.

When the erase and write count is greater than the first reference value Ref1 and is less than or equal to a second reference value Ref2, a first system block changing operation may be performed. First update system information (obtained by updating the default system information) may be stored in the first replacement block Replace BLK 1. The first replacement block Replace BLK 1 may be set as a target system block.

When the erase and write count is greater than the first reference value Ref1 and is less than or equal to the second reference value Ref2, the memory device may perform the read operation, the program operation, or the erase operation based on parameters in the first update system information, which is stored in the first replacement block Replace BLK 1 as the target system block.

When the erase and write count is greater than the second reference value Ref2, a second system block changing operation may be performed. Second update system information may be obtained, for example, by updating the first update system information, and the second update system information may be stored in the second replacement block Replace BLK 2. The second replacement block Replace BLK 2 may be set as a target system block.

When the erase and write count is greater than the second reference value Ref2, the memory device may perform the read operation, the program operation, or the erase operation based on parameters in the second update system information, which stored in the second replacement block Replace BLK 2 as the target system block.

In an embodiment, update system information may be generated based on one or more updated parameters, as the lifetime (or age) of the memory device progresses and, for example, at a time when the system block changing operation is performed. In one embodiment, update system information may be generated based on parameters predicted according to the lifetime of the memory device, which predicted parameters may be designated at the time of manufacture of the memory device.

Figure 5:
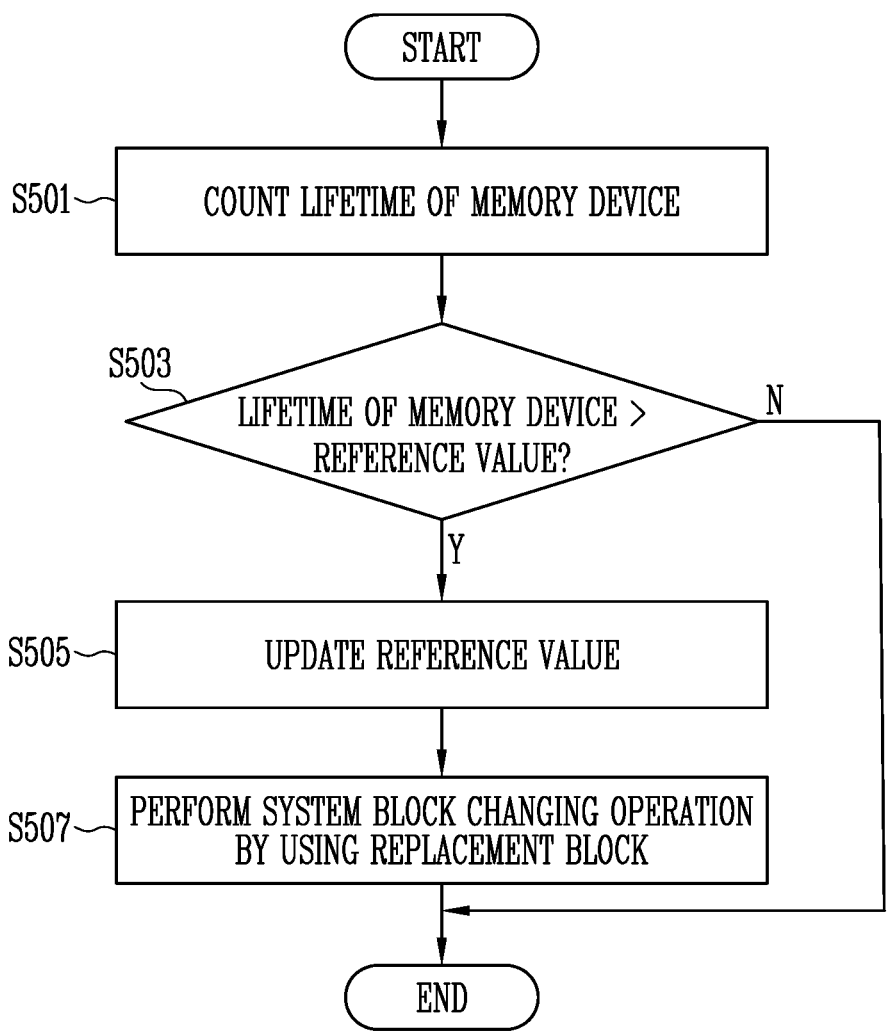
FIG. 5 illustrates an embodiment of the operation of a storage device.

FIG. 5 is a flowchart illustrating an embodiment of a method of operation of a storage device as described herein. Referring to FIG. 5, in operation S501, the storage device may count a lifetime (or determine the age) of the memory device. The storage device may determine the lifetime of the memory device, for example, based on an erase and write count of data blocks in the memory device.

In operation S503, the storage device may determine whether the lifetime of the memory device exceeds a reference value. When the lifetime of the memory device exceeds the reference value as a determination result, the storage device proceeds to operation S505. When the lifetime of the memory device is less than or equal to the reference value as a determination result, the storage device ends the operation.

In the operation S505, the storage device may update the reference value. The updated reference value may be a predetermined value, which, for example, may be set at the time of manufacture of the memory device or at another time or by another party or entity.

In operation S507, the storage device may perform a system block changing operation using a replacement block. For example, the storage device may store update system information, obtained by updating default system information stored in a system block in a selected replacement block, among replacement blocks in the memory device. The storage device may perform the system block changing operation of setting the selected replacement block as a target system block.

Figure 6:
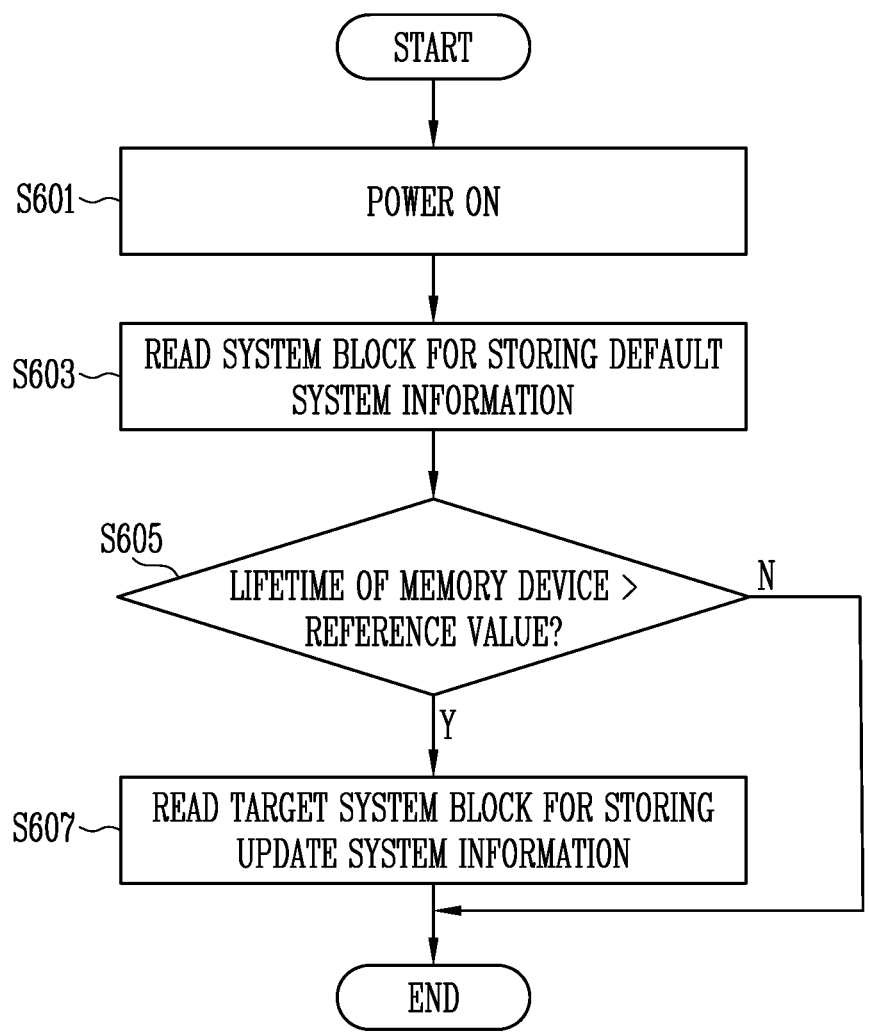
FIG. 6 illustrates an embodiment of a method of operating a storage device.

FIG. 6 is a flowchart illustrating an embodiment of a method of operation of a storage device as described herein. Referring to FIG. 6, in operation S601, the storage device may be booted in power-on.

In operation S603, the storage device may read the system block for storing the default system information described, for example, with reference to FIG. 4.

In operation S605, the storage device may determine whether the lifetime (or age) of the memory device exceeds a reference value. When the lifetime of the memory device exceeds the reference value as a determination result, the storage device proceeds to operation S607. When the lifetime of the memory device is less than or equal to the reference value as a determination result, the storage device ends the operation.

In operation S607, the storage device may read the target system block for storing the update system information described with reference to FIG. 4. Default system information loaded in the system register of the memory device may be changed as the update system information.

Figure 7:
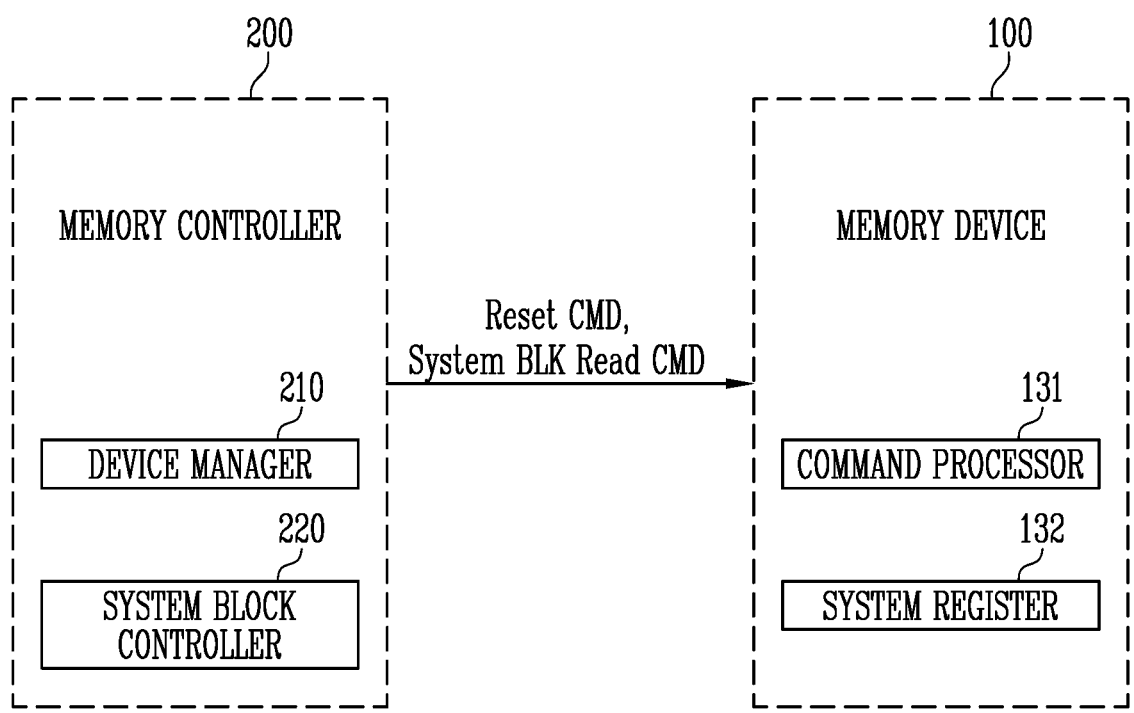
FIG. 7 illustrates an embodiment of the operation of a storage device.

FIG. 7 is a diagram illustrating an embodiment of the operation of a storage device, for example, as shown in FIG. 1. Referring to FIG. 7, the memory controller 200 may include a device manager 210 and a system block controller 220. The memory device 100 may include a command processor 131 and a system register 132 which, for example, may be in or coupled to control logic 130 described with reference to FIG. 2.

The device manager 210 may determine the lifetime of memory device 100 based on an erase and write count associated with data blocks of the memory device 100. The device manager 210 may generate lifetime information of the memory device 100 based on the determined lifetime of the memory device 100.

The system block controller 220 may determine whether the lifetime of the memory device 100 exceeds a reference value based on the lifetime information of the memory device 100. When the lifetime of the memory device 100 exceeds the reference value, the system block controller 220 may perform the system block changing operation described with reference to FIG. 4.

For example, when the lifetime of the memory device 100 exceeds the reference value, the system block controller 220 may provide the memory device 100 with a command for reading default system information in the system block. The system block controller 220 may generate update system information updated as the lifetime of the memory device 100 elapses based on the read default system information. The system block controller 220 may provide the memory device 100 with a program command for storing the update system information in a selected replacement block. The system block controller 220 may set the selected replacement block as a new target system block.

When the memory device 100 is powered on, the system block controller 220 may provide a reset command to the command processor 131. In an embodiment, the reset command may have a value of FFh. The command processor 131 may load the default system information stored in the system block into the system register 132 in response to the reset command. The default system information may include one or more parameters associated with at least one operation among a read operation, a program operation, and an erase operation of the memory device 100.

When the lifetime of the memory device 100 exceeds the reference value, the system block controller 220 may provide a system read command to the command processor 131 after the system block controller 220 provides the reset command. The command processor 131 load the update system information stored in the target system block into the system register 132 in response to the system block read command. For example, the command processor 131 may change the default system information loaded into the system register 132 to correspond to the update system information.

Figure 8:
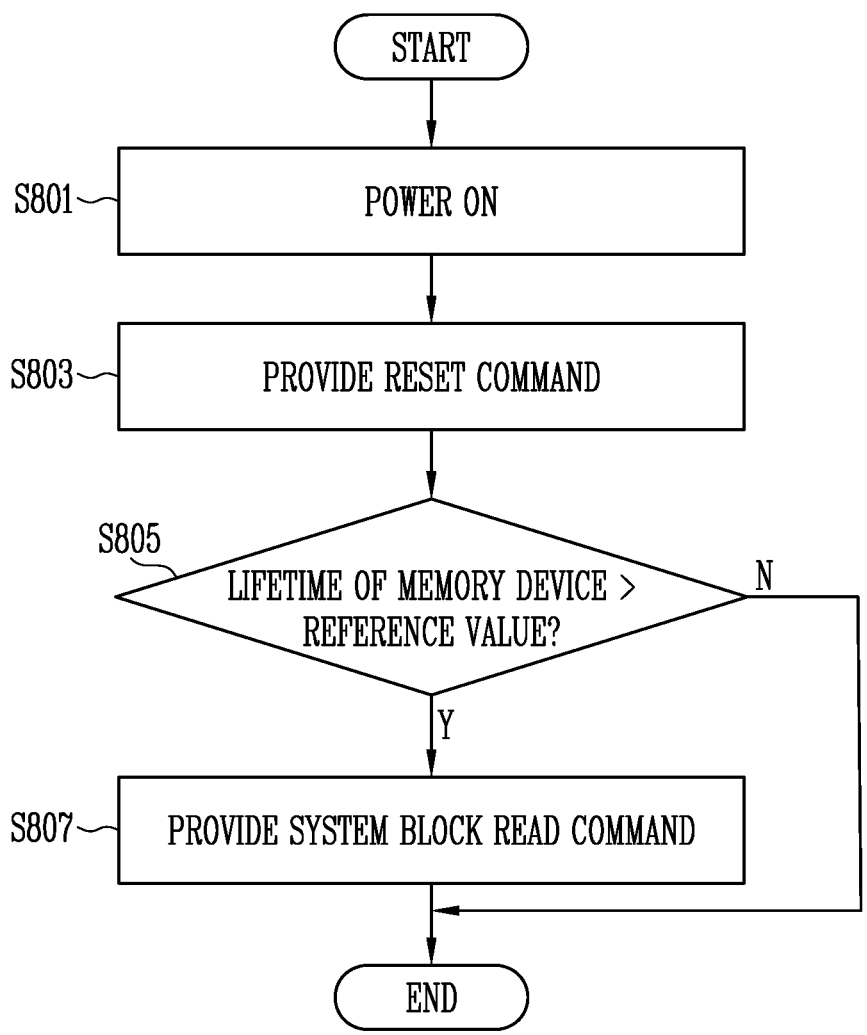
FIG. 8 illustrates an embodiment of operation of a memory controller.

FIG. 8 is a flowchart illustrating operation of the memory controller shown in FIG. 7. Referring to FIG. 8, in operation S801, the memory controller may be powered on.

In operation S803, the memory controller may provide a reset command to the memory device. The memory device may load default system information stored in the system block into the system register in response to the reset command.

In operation S805, the memory controller may determine whether the lifetime (or age) of the memory device exceeds a reference value. When the lifetime of the memory device exceeds the reference value, the memory controller proceeds to operation S807. When the lifetime of the memory device is less than or equal to the reference value, the memory controller ends the operation.

In the operation S807, the memory controller may provide a system block read command to the memory device. The memory device may load update system information stored in the target system block into the system register in response to the system block read command.

Figure 9:
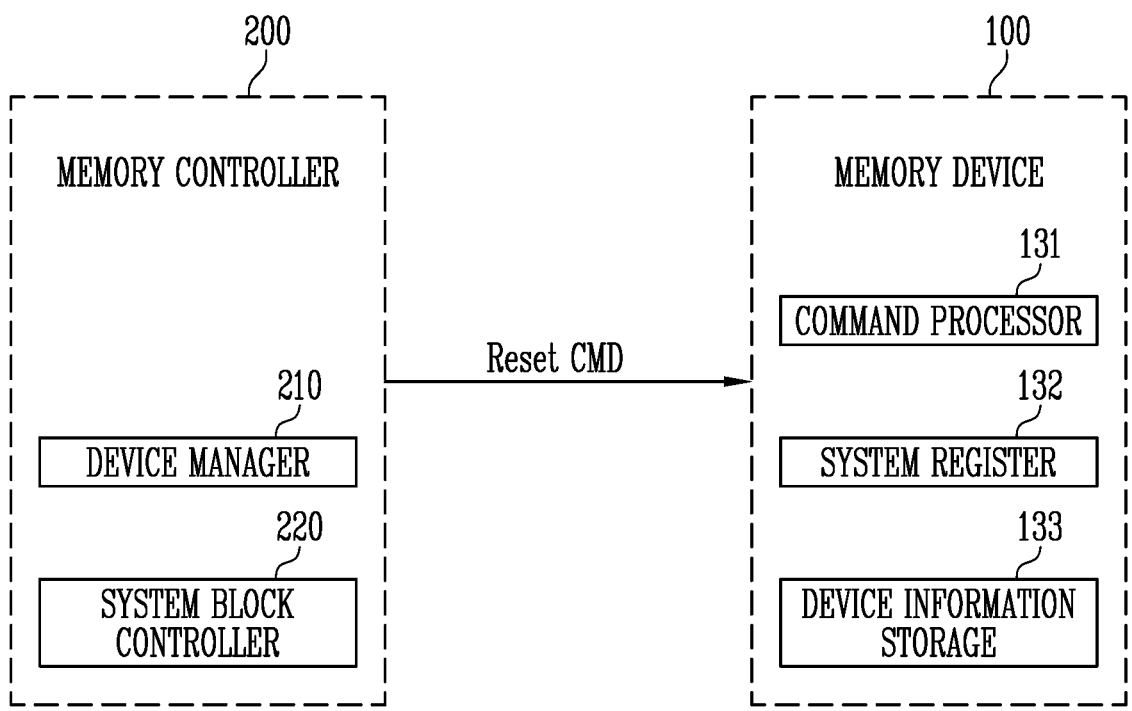
FIG. 9 illustrates an embodiment of operation of a storage device.

FIG. 9 is a diagram illustrating an embodiment of the operation of a storage device, which, for example, may be the storage device shown in FIG. 1.

Referring to FIG. 9, as compared with FIG. 7, the memory device 100 may additionally include a device information storage 133. The device information storage 133 may periodically or non-periodically receive lifetime information of the memory device 100 from the device manager 210. The device information storage 133 may store the lifetime information of the memory device 100.

When the memory device 100 is power on, the system block controller 220 may provide a reset command to the command processor 131. In an embodiment, the reset command may have a value of FFh. The command processor 131 may load the default system information stored in the system block into the system register 132 in response to the reset command. The default system information may include parameters associated with at least one of a read operation, a program operation, and an erase operation of the memory device 100.

The command processor 131 may compare the lifetime of the memory device 100 with a reference value based on the lifetime information of the memory device 100. The lifetime information may be stored in the device information storage 133. When the lifetime of the memory device 100 exceeds the reference value after the command processor 131 receives the reset command, the command processor 131 may additionally read a target system block. For example, the command processor 131 may change the default system information loaded into the system register 132 as update system information stored in the target system block.

As compared with FIG. 7, the memory device 100 may read the update system information stored in the target system block by autonomously comparing the lifetime of the memory device 100 with the reference value. This may be performed even when the memory device 100 does not receive the system block read command, but receives only the reset command from the memory controller 200.

Figure 10:
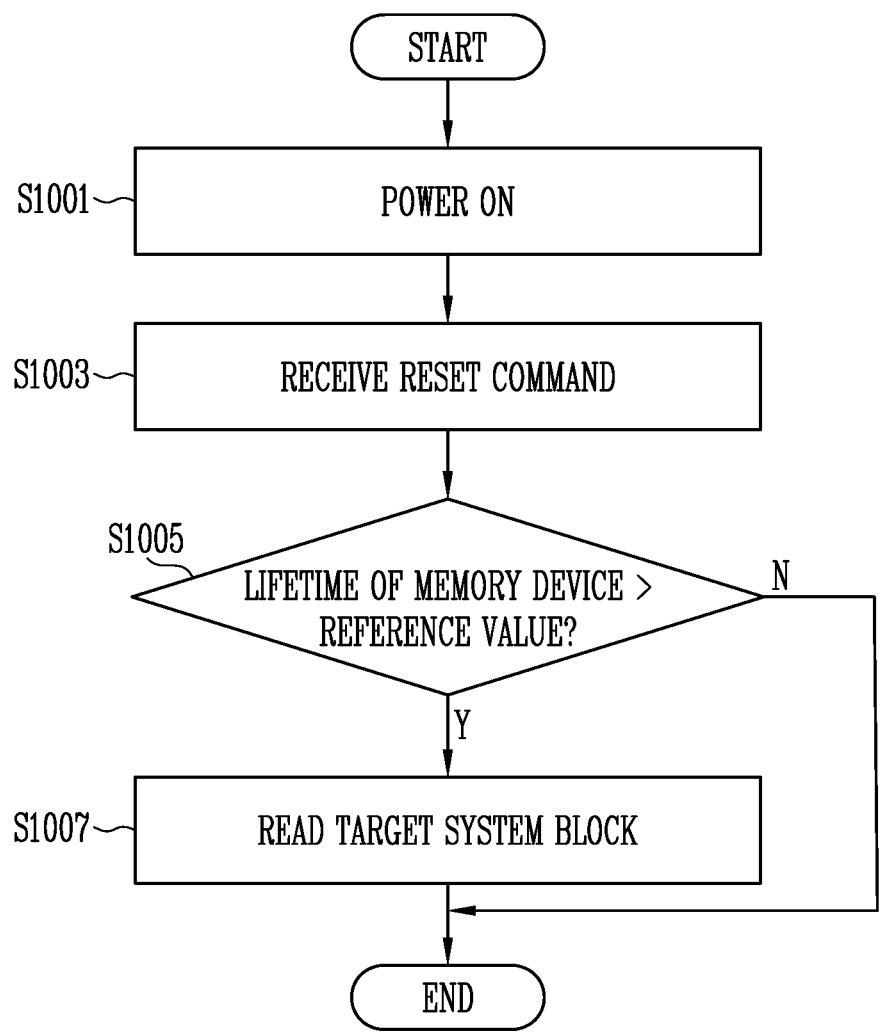
FIG. 10 illustrates an embodiment of a method of operating a memory device.

FIG. 10 is a flowchart illustrating an embodiment of the operation of the memory device shown in FIG. 9. Referring to FIG. 10, in operation S1001, the memory device may be powered on.

In operation S1003, the memory device may receive a reset command from the memory controller. The memory device may load default system information stored in the system block into the system register in response to the reset command.

In operation S1005, the memory device may determine whether the lifetime of the memory device exceeds a reference value. When the lifetime of the memory device exceeds the reference value, the memory device proceeds to operation S1007. When the lifetime of the memory device is less than or equal to the reference value, the memory device ends the operation.

In the operation S1007, the memory device may read a target system block. For example, the memory device may change the default system information loaded into the system register to correspond to update system information stored in the target system block.

Figure 11:
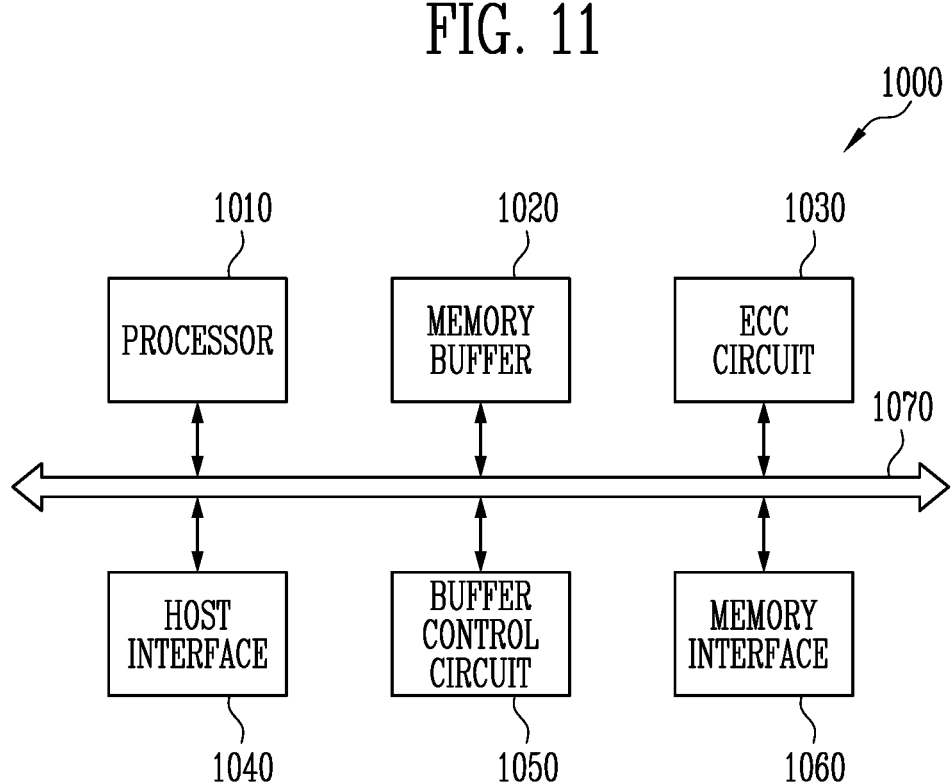
FIG. 11 illustrates an embodiment of a memory controller.

FIG. 11 is a diagram illustrating an embodiment of a memory controller 1000, which, for example, may correspond to the memory controller shown in FIG. 1.

Referring to FIG. 11, the memory controller 1000 is connected to a host and a memory device, and may access the memory device in response to a request received from a host. For example, the memory controller 1000 may control write, read, erase, and/or background operations of the memory device. In one embodiment, the memory controller 1000 may serve an interface between the memory device and the host. The memory controller 1000 may drive instructions (e.g., firmware) for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operation of the memory controller 1000 and may perform one or more logical operations. The processor 1010 may communicate with the external host through the host interface 1040, and may communicate with the memory device through the memory interface 1060. Also, the processor 1010 may communicate with the memory buffer 1020 through the buffer control circuit 1050. The processor 1010 may control operation of the storage device using the memory buffer 1020 as a working memory, a cache memory or a buffer memory.

In one embodiment, the processor 1010 may perform the function of a flash translation layer (FTL). For example, the processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units. Examples of address mapping methods include a page mapping method, a block mapping method, and a hybrid mapping method.

The processor 1010 may randomize data received from the host. For example, the processor 1010 may randomize data received from the host, using a randomizing seed. The randomized data may be provided as data to be stored to the memory device to be programmed in the memory cell array.

In a read operation, the processor 1010 may derandomize data received from the memory device. For example, the processor 1010 may derandomize data from the memory device using a derandomizing seed, which, for example, may be output to the host. In an embodiment, the processor 1010 may perform randomizing and derandomizing by driving software or firmware.

The memory buffer 1020 may be used as a working memory, cache memory, or buffer memory of the processor 1010. The memory buffer 1020 may store codes and commands which are executed by the processor 1010. The memory buffer 1020 may include, for example, a Static RAM (SRAM) or a Dynamic RAM (DRAM).

The ECC circuit 1030 may perform an ECC operation. For example, the ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. For example, the host interface 1040 may communicate with the host using at least one communication standard, protocol, or interface. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel. In an example, the memory controller 1000 may not include the memory buffer 1020 and the buffer control circuit 1050.

In an example, the processor 1010 may control operation of the memory controller 1000 using one or more codes. The processor 1010 may load codes from a nonvolatile memory device (e.g., a read only memory (ROM)) in or coupled to the memory controller 1000. In one example, the processor 1010 may load codes from the memory device through the memory interface 1060.

In an example, the bus 1070 of the memory controller 1000 may be divided into a control bus and a data bus. The data bus may be configured to transmit data in the memory controller 1000. The control bus may be configured to transmit control information (e.g., a command and an address) in the memory controller 1000. In one embodiment, the data bus and the control bus may be separated from each other and therefore may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

In an embodiment, the device manager 210 and the system block controller 220 (e.g., as described with reference to FIGS. 7 and 9) may be in or coupled to the processor 1010.

Figure 12:
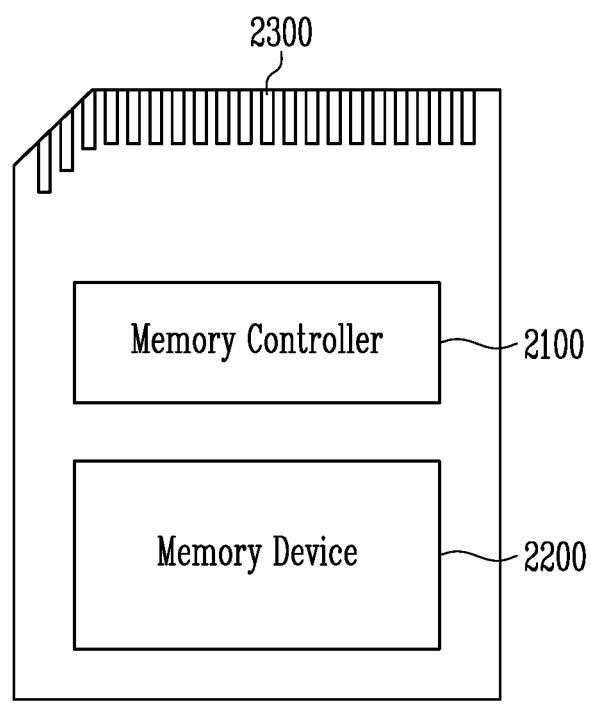
FIG. 12 illustrates an embodiment of a memory card system.

FIG. 12 is a block diagram illustrating an embodiment of a memory card system 2000 to which a storage device as described herein is applied.

Referring to FIG. 12, the memory card system 2000 includes a memory controller 2100, a memory device, and a connector 2300. The memory controller 2100 is connected to and is configured to access the memory device 2200. For example, the memory controller 2100 is configured to control read, write, erase, and/or background operations of the memory device 2200. The memory controller 2100 is configured to serve as an interface between the memory device 2200 and a host. The memory controller 2100 is configured to drive instructions (e.g., firmware) for controlling the memory device 2200. The memory controller 2100 may be implemented, for example, in a manner similar to memory controller 200 described with reference to FIG. 1.

The memory controller 2100 may include various components. Examples include one or more of a Random Access Memory (RAM), processing unit, host interface, memory interface, and error corrector 233.

The memory controller 2100 may communicate with an external device through the connector 2300. For example, the memory controller 2100 may communicate with the external device (e.g., the host) according to a specific communication protocol, standard, or interface. Examples include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 2200 may be implemented with various types of nonvolatile memory devices. Examples include an Electrically Erasable and Programmable ROM (EEPROM), NAND flash memory, NOR flash memory, Phase-change RAM (PRAM), Resistive RAM (ReRAM), Ferroelectric RAM (FRAM), and Spin Torque Transfer magnetic RAM (STT-MRAM).

The memory controller 2100 and the memory device 2200 may be integrated into a single semiconductor device corresponding to a memory card. Examples of the memory card include, but are not limited to, a PC card (Personal Computer Memory Card International Association (PCMCIA)), Compact Flash (CF) card, Smart Media Card (SM and SMC), memory stick, Multi-Media Card (MMC, RS-MMC, MMC-micro and eMMC), SD card (SD, miniSD, microSD and SDHC), and Universal Flash Storage (UFS).

Figure 13:
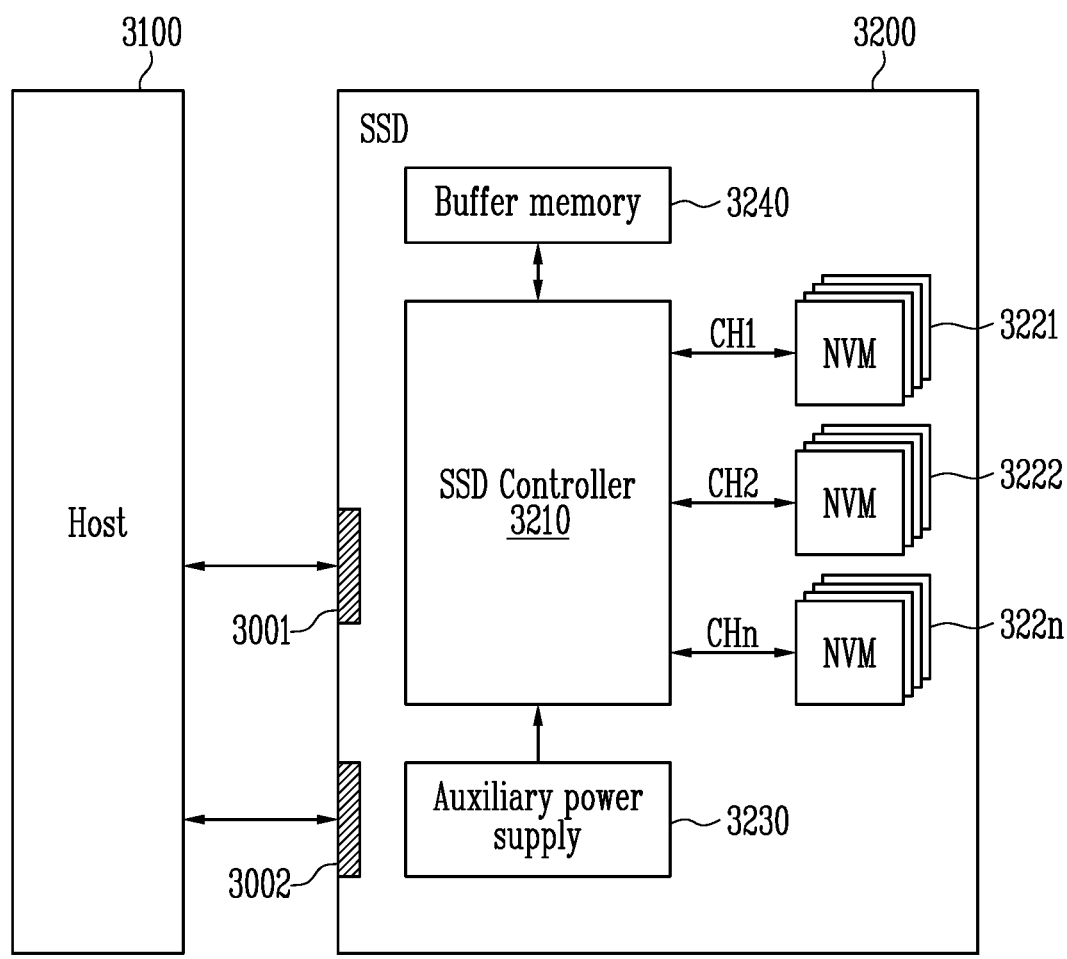
FIG. 13 illustrates an embodiment of a Solid State Drive (SDD).

FIG. 13 is a diagram illustrating an embodiment of a Solid State Drive (SDD) to which a storage device as described herein may be applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002.

The SSD 3200 includes an SSD controller 3210, a plurality of flash memories 3221 to 322*n*, an auxiliary power supply 3230, and a buffer memory 3240. In accordance with an embodiment, the SSD controller 3210 may serve, for example, as the memory controller 200 described with reference to FIG. 1. The SSD controller 3210 may control the plurality of flash memories 3221 to 322*n* in response to a signal SIG received from the host 3100. For example, the signal SIG may be a signal based on an interface between the host 3100 and the SSD 3200, e.g., the signal SIG may be a signal defined by at least one of the following interfaces: a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth or does not conform to a predetermined level or pattern, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 may operate as a buffer memory of the SSD 3200. For example, the buffer memory 3240 may temporarily store data received from the host 3100 or from the plurality of flash memories 3221 to 322*n*, and/or may temporarily store meta data (e.g., a mapping table) of the flash memories 3221 to 322*n*. The buffer memory 3240 may include a volatile memory. Examples include a DRAM, an SDRAM, a DDR SDRAM, an LPDDR SDRAM, and a GRAM or nonvolatile memories such as a FRAM, a ReRAM, an STT-MRAM, and a PRAM.

Figure 14:
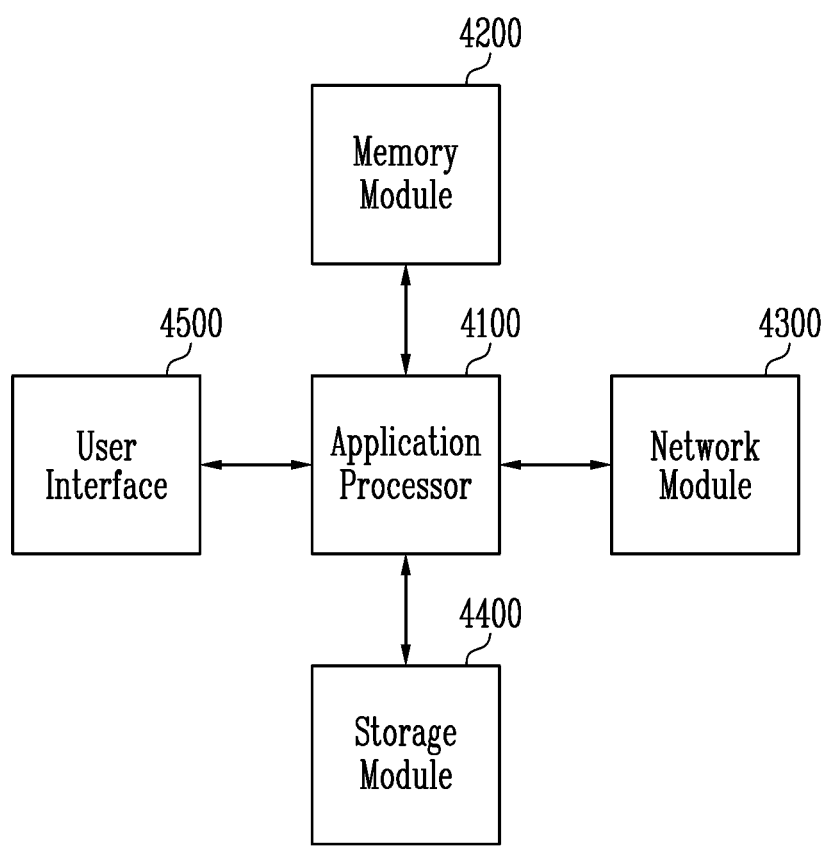
FIG. 14 illustrates an embodiment of a user system.

FIG. 14 is a block diagram illustrating an embodiment of a user system 4000 to which a storage device as described herein is applied.

Referring to FIG. 14, the user system 4000 includes an application processor 4100, a memory module 4200, a network module 4300, a storage module 4400, and a user interface 4500. The application processor 4100 may drive components in the user system 4000, an operating system (OS), a user program, or the like. For example, the application processor 4100 may include one or more controllers for controlling components in the user system 4000, interfaces, a graphic engine, and/or other components. In one embodiment, the application processor 4100 may be provided as a System-on-Chip (SoC).

The memory module 4200 may operate as a main memory, working memory, buffer memory or cache memory of the user system 4000. The memory module 4200 may include a volatile random access memory. Examples include a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In one example, the application processor 4100 and the memory module 4200 may be provided as one semiconductor package, e.g., a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 4300 may, for example, be in or coupled to the application processor 4100.

The storage module 4400 may store data, for example, as received from the application processor 4100. In one embodiment, the storage module 4400 may transmit data stored therein to the application processor 4100. The storage module 4400 may be implemented with a nonvolatile semiconductor memory device. Examples include a Phase-change RAM (PRAM), a Magnetic RAM (MRAM), a Resistive RAM (RRAM), a NAND flash, a NOR flash, or a NAND flash having a three-dimensional structure. In one embodiment, the storage module 4400 may be provided as a removable drive, such as a memory card of the user system 4000 or an external drive.

The storage module 4400 may include a plurality of nonvolatile memory devices, each of which may operate, for example, in a manner similar to the memory device 100 described with reference to FIG. 1. In one embodiment, the storage module 4400 may operate in a manner similar to the storage device 50 as described with reference to FIG. 1.

The user interface 4500 may include interfaces for inputting data or commands to the application processor 4100 and/or outputting data to an external device. The user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with one or more of the aforementioned embodiments, a storage device is provided to have improved system block management performance. A method of operating a storage device to achieve this improved performance is also provided in accordance with one or more embodiments.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, managers, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure. The embodiments may be combined to form additional embodiments.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:
1. A storage device comprising:
a memory device including a plurality of data blocks, a plurality of replacement blocks to replace bad blocks, and a system block configured to store default system information; and
a memory controller configured to store, based on a result of comparing a lifetime of the memory device with a reference value, update system information corresponding to an update of the default system information, in a selected replacement block among the plurality of replacement blocks, and to control the memory device to set the selected replacement block as a target system block, wherein the default system information includes one or more parameters corresponding to at least one operation among a read operation, a program operation, and an erase operation of the memory device.

2. The storage device of claim 1, wherein
the memory device includes a system register configured to store the one or more parameters, and
the memory controller includes:
a device manager configured to manage lifetime information of the memory device; and
a system block controller configured to provide the memory device with a reset command to load the default system information into the system register, after power on of the memory device.

3. The storage device of claim 2, wherein the device manager is configured to determine the lifetime of the memory device based on an erase and write count of one or more of the plurality of data blocks.

4. The storage device of claim 2, wherein
the system block controller is configured to update the reference value after the system block controller performs a system block changing operation, and
the system block changing operation includes setting the selected replacement block as the target system block.

5. The storage device of claim 4, wherein the system block controller is configured to:
store system information, obtained by updating the update system information again, in another replacement block different from the selected replacement block, among the plurality of replacement blocks, based on a result of comparing the lifetime of the memory device with the updated reference value; and
control the memory device to set the another replacement block as the target system block.

6. The storage device of claim 2, wherein the memory device further includes a command processor configured to load the default system information stored in the system block into the system register in response to the reset command.

7. The storage device of claim 6, wherein
after the system block controller provides the reset command to the memory device, the system block controller is configured to provide the memory device with a system block read command to load the update system information stored in the target system block, into the system register.

8. The storage device of claim 7, wherein the command processor is configured to change the default system information loaded into the system register to correspond to the update system information, in response to the system block read command.

9. The storage device of claim 6, wherein
the memory device further includes a device information storage configured to store the lifetime information of the memory device, which is received from the memory controller, and
the command processor is configured to change the default system information loaded into the system register to the update system information stored in the target system block, based on the result of comparing the lifetime of the memory device with the reference value.

10. The storage device of claim 1, wherein the one or more parameters corresponding to the at least one operation include information on a voltage to be used in the at least one operation and information on voltage applying time.

11. The storage device of claim 1, wherein the update system information includes
one or more predetermined parameters corresponding to the lifetime of the memory device, or
one or more parameters obtained by updating the one or more parameters in the default system information as the lifetime of the memory device elapses.

12. The storage device of claim 1, wherein the system block is included in a Content Addressable Memory (CAM) area.

13. A method for operating a memory device, the method comprising:
storing, based on a result of comparing a lifetime of the memory device with a reference value, update system information corresponding to an update of default system information stored in a system block, in a selected replacement block among a plurality of replacement blocks for replacing bad blocks, and
setting the selected replacement block as a target system block, wherein the default system information includes one or more parameters corresponding to at least one operation among a read operation, a program operation, and an erase operation of the memory device.

14. The method of claim 13, wherein
the memory device includes a system register configured to store the one or more parameters, and
the method further comprises loading the default system information into the system register, after power on of the memory device.

15. The method of claim 14, further comprising
replacing the default system information loaded into the system register with the update system information stored in the target system block, based on the result of comparing the lifetime of the memory device with the reference value.

16. The method of claim 13, further comprising
determining the lifetime of the memory device based on an erase and write count of a plurality of data blocks of the memory device.

17. The method of claim 13, further comprising
updating the reference value after the system block changing operation, wherein the system block changing operation includes setting the selected replacement block as a target system block.

18. The method of claim 17, further comprising:
storing system information, obtained by updating the update system information again, in another replacement block different from the selected replacement block, among the plurality of replacement blocks, based on a result of comparing the lifetime of the memory device with an updated reference value; and
setting the another replacement block as the target system block.

19. The method of claim 13, wherein the one or more parameters corresponding to the at least one operation include information on voltage to be used in the at least one operation and information on voltage applying time.

20. The method of claim 13, wherein the update system information includes
one or more predetermined parameters corresponding to the lifetime of the memory device, or
one or more parameters obtained by updating the one or more parameters in the default system information as the lifetime of the memory device elapses.

* * * * *